United States Patent
Carson et al.

(10) Patent No.: US 12,530,047 B2
(45) Date of Patent: Jan. 20, 2026

(54) TRACK PLAN TO IMPROVE CLOCK SKEW

(71) Applicant: Tesla, Inc., Austin, TX (US)

(72) Inventors: Derek Carson, San Jose, CA (US); Anantha Kumar Nivarti, Fremont, CA (US); Timothy Fischer, Denver, CO (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 19/100,846

(22) PCT Filed: Aug. 16, 2023

(86) PCT No.: PCT/US2023/072295
§ 371 (c)(1),
(2) Date: Feb. 3, 2025

(87) PCT Pub. No.: WO2024/040108
PCT Pub. Date: Feb. 22, 2024

(65) Prior Publication Data
US 2025/0258518 A1   Aug. 14, 2025

Related U.S. Application Data

(60) Provisional application No. 63/371,951, filed on Aug. 19, 2022.

(51) Int. Cl.
*G06F 1/10* (2006.01)
*H03K 5/13* (2014.01)
*H03K 5/00* (2006.01)

(52) U.S. Cl.
CPC ............. *G06F 1/10* (2013.01); *H03K 5/13* (2013.01); *H03K 2005/00078* (2013.01)

(58) Field of Classification Search
CPC ........................................... G06F 1/10
See application file for complete search history.

(56) References Cited

U.S. PATENT DOCUMENTS 5,416,861 A * 5/1995 Koh .................. G06F 1/105
398/154
6,144,224 A    11/2000 Lee et al.
(Continued)

FOREIGN PATENT DOCUMENTS

CN    1532935 A     9/2004
CN    101419482     4/2009
(Continued)

OTHER PUBLICATIONS

International Search Report and Written Opinion dated Dec. 8, 2023 in International Application No. PCT/US2023/072295.
(Continued)

*Primary Examiner* — Phil K Nguyen
(74) *Attorney, Agent, or Firm* — Knobbe Martens Olson & Bear, LLP

(57) ABSTRACT

Track plans to improve clock skew are disclosed. In one aspect, a node array includes a plurality of nodes with clock distribution circuitry configured to distribute a clock signal to each of the nodes. The clock signal propagates in at least a first direction between adjacent nodes. The node (202) further includes a track plan comprising a plurality of wires to carry communication signals propagating between adjacent nodes. The plurality of wires include a first wire (404) configured to carry a first communication signal in a direction opposite to the first direction and a second wire (402) configured to carry a second communication signal in the first direction, where the first wire has a width that is greater than a width of the second wire.

20 Claims, 7 Drawing Sheets

(56) References Cited

U.S. PATENT DOCUMENTS

| | | | |
|---|---|---|---|
| 7,093,150 B1 * | 8/2006 | Norman | G06F 1/10 |
| | | | 713/400 |
| 8,001,504 B1 * | 8/2011 | Campbell | G06F 30/396 |
| | | | 716/108 |
| 11,652,663 B1 * | 5/2023 | Driscoll | H04L 12/40032 |
| | | | 370/400 |
| 2005/0152379 A1 * | 7/2005 | Hall | H04L 12/437 |
| | | | 370/400 |
| 2008/0276116 A1 | 11/2008 | Bjerregaard | |
| 2013/0156421 A1 * | 6/2013 | Bravi | H04B 10/07951 |
| | | | 398/29 |
| 2014/0289690 A1 * | 9/2014 | Chopra | G06F 30/396 |
| | | | 716/113 |
| 2018/0248797 A1 * | 8/2018 | Kim | H04L 12/42 |
| 2018/0336957 A1 * | 11/2018 | Mi | G09G 3/20 |
| 2019/0294203 A1 | 9/2019 | Arp et al. | |
| 2019/0378007 A1 * | 12/2019 | Markram | G06N 3/082 |
| 2023/0266788 A1 * | 8/2023 | Chen | H04L 12/422 |
| | | | 713/400 |
| 2025/0192910 A1 * | 6/2025 | Giorgi | H04J 14/0283 |

FOREIGN PATENT DOCUMENTS

| | | |
|---|---|---|
| CN | 102077493 | 5/2011 |
| CN | 114139481 | 3/2022 |
| JP | 2016-506106 | 2/2016 |

OTHER PUBLICATIONS

Fischer et al., "9.1 D1: A 7nm ML Training Processor with Wave Clock Distribution," 2023 IEEE International Solid-State Circuits Conference (ISSCC), Feb. 21, 2023, pp. 156-158.

* cited by examiner

| ROW→ COL↓ | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 17 | 18 |
| 2 | 2 | 3 | 4 | 5 | 6 | 7 | 8 | 9 | 10 | 11 | 12 | 13 | 14 | 15 | 16 | 17 | 18 | 19 |
| 3 | 3 | 4 | 5 | 6 | 7 | 8 | 9 | 10 | 11 | 12 | 13 | 14 | 15 | 16 | 17 | 18 | 19 | 20 |
| 4 | 4 | 5 | 6 | 7 | 8 | 9 | 10 | 11 | 12 | 13 | 14 | 15 | 16 | 17 | 18 | 19 | 20 | 21 |
| 5 | 5 | 6 | 7 | 8 | 9 | 10 | 11 | 12 | 13 | 14 | 15 | 16 | 17 | 18 | 19 | 20 | 21 | 22 |
| 6 | 6 | 7 | 8 | 9 | 10 | 11 | 12 | 13 | 14 | 15 | 16 | 17 | 18 | 19 | 20 | 21 | 22 | 23 |
| 7 | 7 | 8 | 9 | 10 | 11 | 12 | 13 | 14 | 15 | 16 | 17 | 18 | 19 | 20 | 21 | 22 | 23 | 24 |
| 8 | 8 | 9 | 10 | 11 | 12 | 13 | 14 | 15 | 16 | 17 | 18 | 19 | 20 | 21 | 22 | 23 | 24 | 25 |
| 9 | 9 | 10 | 11 | 12 | 13 | 14 | 15 | 16 | 17 | 18 | 19 | 20 | 21 | 22 | 23 | 24 | 25 | 26 |
| 10 | 10 | 11 | 12 | 13 | 14 | 15 | 16 | 17 | 18 | 19 | 20 | 21 | 22 | 23 | 24 | 25 | 26 | 27 |
| 11 | 11 | 12 | 13 | 14 | 15 | 16 | 17 | 18 | 19 | 20 | 21 | 22 | 23 | 24 | 25 | 26 | 27 | 28 |
| 12 | 12 | 13 | 14 | 15 | 16 | 17 | 18 | 19 | 20 | 21 | 22 | 23 | 24 | 25 | 26 | 27 | 28 | 29 |
| 13 | 13 | 14 | 14 | 14 | 14 | 14 | 14 | 14 | 14 | 14 | 14 | 14 | 14 | 14 | 14 | 28 | 29 | 30 |
| 14 | 14 | 15 | 16 | 17 | 18 | 19 | 20 | 21 | 22 | 23 | 24 | 25 | 26 | 27 | 28 | 29 | 30 | 31 |
| 15 | 15 | 16 | 17 | 18 | 19 | 20 | 21 | 22 | 23 | 24 | 25 | 26 | 27 | 28 | 29 | 30 | 31 | 32 |
| 16 | 16 | 17 | 18 | 19 | 20 | 21 | 22 | 23 | 24 | 25 | 26 | 27 | 28 | 29 | 30 | 31 | 32 | 33 |
| 17 | 17 | 18 | 19 | 20 | 21 | 22 | 23 | 24 | 25 | 26 | 27 | 28 | 29 | 30 | 31 | 32 | 33 | 34 |
| 18 | 18 | 19 | 20 | 21 | 22 | 23 | 24 | 25 | 26 | 27 | 28 | 29 | 30 | 31 | 32 | 33 | 34 | 35 |

FIG. 2

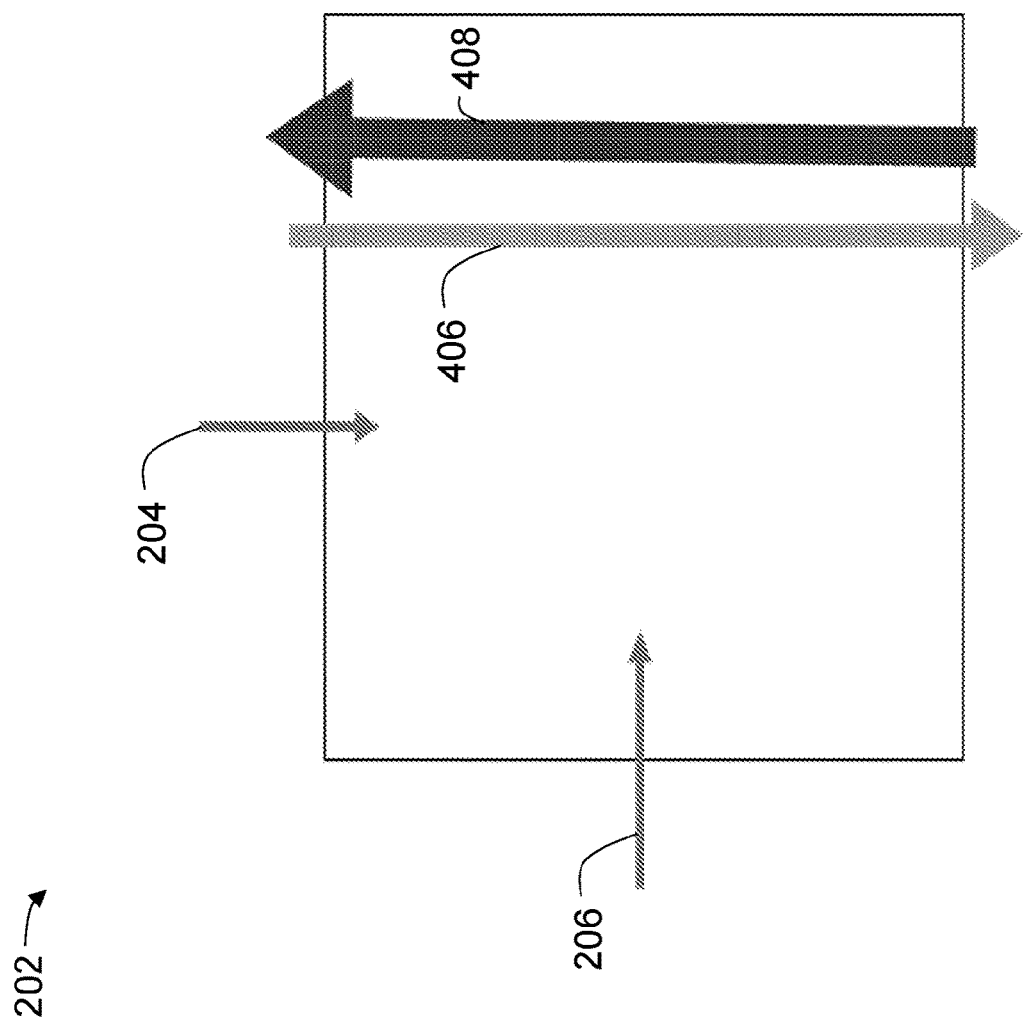

TRACK PLAN TO IMPROVE CLOCK SKEW

CROSS-REFERENCE TO RELATED APPLICATION

This application is a U.S. national phase application under 35 U.S.C. § 371 of International Application No. PCT/US2023/072295, filed Aug. 16, 2023, which claims the benefit of U.S. Provisional Patent Application No. 63/371,951, filed Aug. 19, 2022, the disclosures of each of which are incorporated herein by reference in their entireties and for all purposes.

BACKGROUND

Technical Field

The present disclosure relates generally to distributed clocking, and more particularly, to techniques for reducing clock skew.

Description of the Related Technology

An artificial intelligence (AI) processor can be constructed using an array of processing nodes. The nodes forming the array can communicate with their neighboring nodes in order to perform processing tasks. A clock signal can be provided to each node so that the nodes can be synchronized to enable communication therebetween. One technique for providing clock signals to an array of nodes is distributed clocking.

SUMMARY OF CERTAIN INVENTIVE ASPECTS

In one aspect, there is provided a node array with a track plan for improved clock skew, the node array comprising: a first node comprising computing circuitry and a plurality of wires configured to carry communication signals generated by the first node to neighboring nodes of the node array; a second node that is one of the neighboring nodes; and a third node that is one of the neighboring nodes, wherein a clock signal propagates from the second node to the first node to the third node in a first direction; and wherein the plurality of wires of the first node comprises: a first wire configured to carry a first communication signal to the second node in a direction that is opposite to the first direction, and a second wire configured to carry a second communication signal to the third node in the first direction, wherein the first wire has a width that is greater than a width of the second wire.

In certain embodiments, the width of the first wire and the width of the second wire contribute to meeting a setup time and a hold time for electronic components in the second and third nodes.

In certain embodiments, the plurality of wires further comprise: a plurality of first wires extending in the first direction and comprising the first wire, the plurality of first wires configured to carry a plurality of first communication signals to the second node in the direction that is opposite to the first direction, and a plurality of second wires extending in the first direction and comprising the second wire, the plurality of second wires configured to carry a plurality of second communication signals to the third node in the first direction, wherein the plurality of first wires are interleaved with the plurality of second wires.

In certain embodiments, the node array further comprises: a fourth node that is one of the neighboring nodes; and a fifth node that is one of the neighboring nodes, wherein the clock signal propagates from the fourth node to the first node to the fifth node in a second direction that is perpendicular to the first direction, wherein the plurality of wires of the first node further comprises: a third wire extending in the second direction and configured to carry a third communication signal to the fourth node in a direction that is opposite to the second direction; and a fourth wire extending in the second direction and configured to carry a fourth communication signal to the fifth node in the second direction, wherein the third wire has a width that is greater than a width of the fourth wire.

In certain embodiments, each of the first, second, third, fourth, and fifth nodes has a greater length in the first direction than a length in the second direction, the width of the first wire greater than the width of the third wire, and the width of the second wire is greater than the width of the fourth wire.

In certain embodiments, the plurality of wires further comprise: a plurality of third wires extending in the second direction and comprising the third wire, the plurality of third wires configured to carry a plurality of third communication signals to the fourth node in the direction opposite to the second direction, and a plurality of fourth wires extending in the second direction and comprising the fourth wire, the plurality of fourth wires configured to carry a plurality of fourth communication signals to the fifth node in the second direction, wherein the plurality of third wires are interleaved with the plurality of fourth wires.

In certain embodiments, the clock signal has a substantially fixed delay when propagating between neighboring nodes.

In certain embodiments, nodes of the node array are configured to operate with a timing offset compared to other nodes based on a timing at which the nodes receive the clock signal.

In another aspect, there is provided a node of a node array with track plan for improving clock skew in the node array, the node comprising: computing circuitry configured to generate communication signals; and a plurality of wires configured to enable the communication signals to propagate to adjacent nodes of the node array, wherein the nodes of the node array are configured to receive a distributed clock signal that propagates in at least a first direction between the adjacent nodes, wherein the plurality of wires comprise: a first wire configured to carry a first communication signal in a direction opposite to the first direction, and a second wire configured to carry a second communication signal in the first direction, wherein the first wire has a width that is greater than a width of the second wire.

In certain embodiments, the width of the first wire and the width of the second wire contribute to meeting a setup time and a hold time for electronic components in respective destination nodes for the first communication signal and the second communication signal.

In certain embodiments, the plurality of wires further comprise: a plurality of first wires extending in the first direction and comprising the first wire, the plurality of fires wires configured to carry a plurality of first communication signals in the direction opposite to the first direction, and a plurality of second wires extending in the first direction and comprising the second wire, the plurality of second wires configured to carry a plurality of second communication signals in the first direction, wherein the plurality of first wires are interleaved with the plurality of second wires.

In certain embodiments, the clock signal further propagates in a second direction between the adjacent nodes, the second direction being perpendicular to the first direction, and the plurality of wires further comprise: a third wire extending in the second direction and configured to carry a third communication signal in a direction opposite to the second direction; and a fourth wire extending in the third second and configured to carry a fourth communication signal in the second direction, wherein the third wire has a width that is greater than a width of the fourth wire.

In certain embodiments, the node has a greater length in the first direction than a length in the second direction, the width of the first wire greater than the width of the third wire, and the width of the second wire is greater than the width of the fourth wire.

In certain embodiments, the plurality of wires further comprise: a plurality of third wires extending in the second direction and comprising the third wire, the plurality of third wires configured to carry a plurality of third communication signals in the direction opposite to the second direction, and a plurality of fourth wires extending in the second direction and comprising the fourth wire, the plurality of fourth wires configured to carry a plurality of fourth communication signals in the second direction, wherein the plurality of third wires are interleaved with the plurality of fourth wires.

In certain embodiments, the clock signal is further configured to be distributed with a substantially fixed delay when propagating between adjacent nodes.

In certain embodiments, the node is configured to operate with a timing offset compared to other nodes of the node array based on a timing at which the node receives the clock signal.

In yet another aspect, there is provided a method of manufacturing a node array, the method comprising: forming a first node comprising computing circuitry and a plurality of wires configured to carry communication signals generated by the first node to neighboring nodes of the node array; forming a second node that is one of the neighboring nodes; and forming a third node that is one of the neighboring nodes, wherein a clock signal propagates from the second node to the first node to the third node in a first direction, and wherein the plurality of wires of the first node comprises: a first wire configured to carry a first communication signal to the second node in a direction that is opposite to the first direction, and a second wire configured to carry a second communication signal in the first direction, wherein the first wire has a width that is greater than a width of the second wire.

In certain embodiments, the width of the first wire and the width of the second wire are selected to meet a setup time and a hold time for electronic components in the second and third nodes.

In certain embodiments, the plurality of wires further comprise: a plurality of first wires extending in the first direction and comprising the first wire, the plurality of first wires configured to carry a plurality of first communication signals to the second node in the direction that is opposite to the first direction, and a plurality of second wires extending in the first direction and comprising the second wire, the plurality of second wires configured to carry a plurality of second communication signals to the third node in the first direction, wherein the plurality of first wires are interleaved with the plurality of second wires.

In certain embodiments, the node array further comprises: a fourth node that is one of the neighboring nodes; and a fifth node that is one of the neighboring nodes, wherein the clock signal propagates from the fourth node to the first node to the fifth node in a second direction perpendicular to the first direction, the plurality of wires of the first node further comprise: a third wire extending in the second direction and configured to carry a third communication signal to the fourth node in a direction that is opposite to the second direction; and a fourth wire extending in the second direction and configured to carry a fourth communication signal to the fifth node in the second direction, wherein the third wire has a width that is greater than a width of the fourth wire.

BRIEF DESCRIPTION OF THE DRAWINGS

FIG. 2 is a node clock-level map associated with an example node array, such as the node array of FIG. 1.

FIGS. 4A and 4B illustrate example clock propagation directions as well as signal propagation directions for a node of the array in accordance with aspects of this disclosure.

DETAILED DESCRIPTION OF CERTAIN EMBODIMENTS

Figure 1:
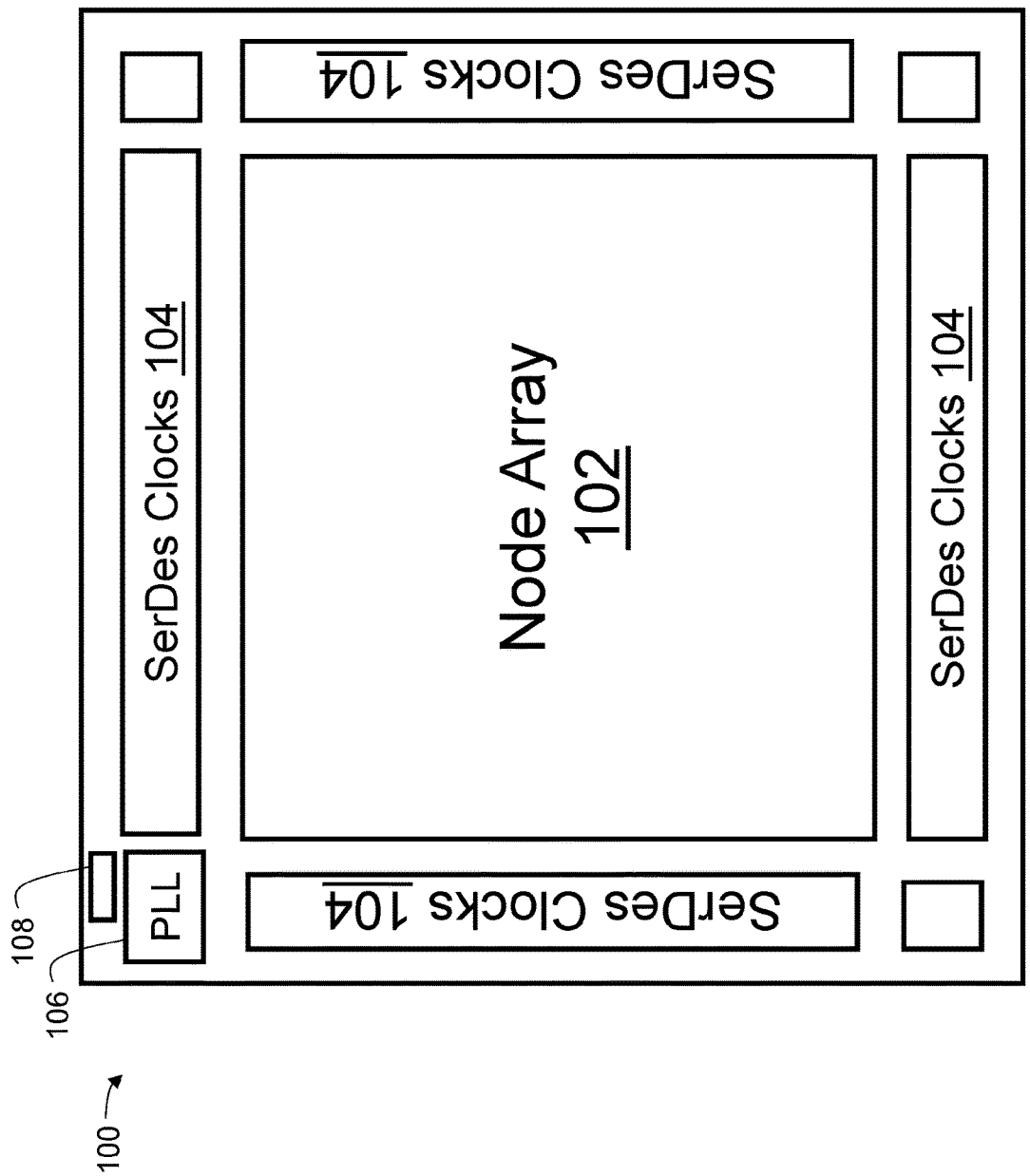
FIG. 1 is a schematic block diagram of an example chip in accordance with aspects of this disclosure.

The following description of certain embodiments presents various descriptions of specific embodiments. However, the innovations described herein may be embodied in a multitude of different ways, for example, as defined and covered by the claims. In this description, reference is made to the drawings where like reference numerals may indicate identical or functionally similar elements. It will be understood that elements illustrated in the figures are not necessarily drawn to scale. Moreover, it will be understood that certain embodiments may include more elements than illustrated in a drawing and/or a subset of the elements illustrated in a drawing. Further, some embodiments may incorporate any suitable combination of features from two or more drawings. The headings provided herein are for convenience only and do not necessarily affect the scope or meaning of the claims.

Introduction to Node Array

This disclosure relates to a clock distribution network with a clock signal that arrives at different times at various nodes of a node array. Clocking with fixed offsets can be referred to as mesochronous clocking. Embodiments disclosed herein relate to a mesochronous clock network that can be built modularly of common circuitry. The clock signals of such a network can be locally low-skew and mesochronous at a coarser level.

Traditionally, a clock signal is constructed and routed at the top level of a chip, which incurs effort, area, and power costs on the design. In such a case, the clock distribution is a custom design at the top level of the chip. One way to do this is to route the clock signal in channels between sub-blocks. This can break up the design and consume area. Another way is to push the top-level clock down into sub-blocks. This can slow the design process and cause identical portions of the design to be forked, where unique copies are created. Traditional approaches can result in a clock signal that arrives at all receivers at approximately the same time. Then circuits can operate in lock step.

In clock distribution networks disclosed herein, a clock arrives at various receivers at different times. The clock signal can be distributed through a 2-dimensional (2D) array of nodes such that the clock signal arrives at different nodes with different timing offsets. Because of the clock distribution structure, the arrival times can be grouped in contours or waves across a die. At a local level, circuitry of a node can operate in lock step. More globally, circuitry in different nodes of a node array can operate with timing offsets relative to each other. Peak current from a power grid can be reduced by having different nodes perform computing with timing offsets relative to each other. Quality of a power supply signal can also be improved by such computing. Computing circuitry can be designed to handle the arrival time differences of the clock signal.

Clock distribution networks disclosed herein can simplify the top-level design of the chip and the clock circuitry construction. Clocking with fixed offsets can be referred to as mesochronous clocking. Embodiments disclosed herein allow a mesochronous clock network to be built modularly of instances of common sub-section designs. The clock signals of such a network can be locally low-skew and mesochronous at a coarser level.

The clock distribution disclosed herein can be applied to any suitable chip. In certain applications, clock distribution disclosed herein can be applied to chips that each include an array of smaller compute nodes. The compute nodes can be referred to processors or cores. In this way, the clock signals can form an arrival-time wave across the array. Each compute node can receive a low skew clock signal. A compute node of the array can be designed with only the interface to neighbor compute nodes accounting for the arrival-time difference (skew) of the mesochronous clock phases. A chip with a clock distribution network disclosed herein can have a 35 phase mesochronous clock or a 41 phase mesochronous clock, for example. The clock distribution described herein can be used in a node array that is square (equal rows and columns) or in a node array that is rectangular with a different number of rows than columns.

FIG. 1 is a schematic block diagram of an example chip 100 in accordance with aspects of this disclosure. The chip 100 can be an integrated circuit die. The chip 100 can include a node array 102 (also referred to as a computational node array) with distributed clocking, one or more Serializer/Deserializer (SerDes) clock blocks 104, a clock generator 106, and a clock controller 108. The SerDes clock blocks 104 can interface with other chips 100 forming an array of chips 100. In certain application instances, the node array 102 can be included on a chip 100 in a system-on-wafer system, an array of chips 100 on a printed circuit board, or the like. In certain applications, the node array 102 of FIG. 1 can be implemented on a system on a wafer that is packaged with a wafer-level packaging structure. As shown in the embodiment of FIG. 1, the clock generator 106 can be implemented external to the node array 102. In some embodiments, the clock generator 106 can include a phase-locked loop (PLL). The clock generator 106 can be arranged to provide a clock signal to a compute node at a corner of the node array 102. The clock controller 108 can also be implemented outside of the node array 102. The nodes within the node array 102 can include node to node interfaces that can be configured to communicate synchronously. A core to Serializer/Deserializer (SerDes) interface can be asynchronous.

In the node array 102 with distributed clocking of FIG. 1, each node can be an instance of a computing circuit (also referred to as a processing core or compute node). In certain applications, most of the nodes can be implemented as instances of a computing circuit, and one or more of the nodes can be implemented as instances of a different circuit. Each node of the node array 102 can include an instance of substantially the same clock distribution circuitry even if other circuitry of at least some of the nodes is different than that of other nodes. In the node array 102, nodes can be tiled and abutted. For example, each node of the node array 102 can be self-contained and interconnected to adjacent node (s)). At the same time, the node array 102 can be implemented without the use of top-level wires or gates. Accordingly, nodes can be configured to communicate with neighboring nodes with lower-level wires over short connections. In some embodiments, the nodes of the node array 102 can be stepped without mirroring or rotation. In certain implementations, the nodes can be aligned to the grid pitch of the power supply lines ($V_{DD}/V_{SS}$). For example, the height and width of each node can be multiples of the power supply grid pitch. The power supply grid pitch can further be aligned to a bump pitch.

Each node of the node array 102 can include an instance of substantially the same clock distribution circuitry. The nodes can be designed such that output clock wires of a node are aligned with the input clock wires of its neighboring nodes. The nodes can be stepped and tiled in the node array such that clock output wires align with and electrically connect with clock input wires of neighboring nodes that are arranged downstream to receive the clock signals. With such electrical connections, the node array can be implemented without channels or top-level wiring for clock distribution. In certain embodiments, fanouts of the clock distribution circuitry can be balanced for inverters.

As described herein, the clock signal received at a root node can propagate from the root node to two neighboring nodes with one unit of delay. The root node can be located at a corner of the node array 102. The unit of delay can be a fixed offset for a given node array. The unit of delay can correspond to a delay from buffering the clock signal (e.g., using inverters) and the wire delay associated with the clock signal propagating to its neighboring node(s).

One of the two neighboring nodes can be located in the same row as the root node and the other of the two neighboring nodes can be located in the same column as the root node. The neighboring nodes abut the root node. As one example, the neighboring nodes are to the south and the east of the root node in FIG. 2. The clock signal continues to propagate with one more unit of delay to neighboring nodes to the south and east from the two neighboring nodes of the root node in the node array in this example. Such clock signal propagation continues through the clock distribution network in the node array 102 until the clock signal reaches the node of the node array 102 at an opposite corner from the root node. In this example, a signal that is routed from an originating node that generates the signal to a neighboring node that is north or west of the originating node can travel upstream and lose one unit delay in a node array 102, and a signal that is routed from an originating node to a neighboring node that is south or east can travel downstream and gain one unit delay in a node array 102. Signals traveling upstream can be routed faster than signals traveling downstream to account for the unit delay and meet setup and hold time specifications.

FIG. 2 is a node clock-level map associated with an example node array, such as the node array 102 of FIG. 1. The example node array 102 has 18 rows and 18 columns. With 18 rows and 18 columns, there can be 324 nodes. As another example, a node array 102 can include 360 nodes arranged in rows and columns. This clock map includes the number of unit delays for a clock signal output for a node of the array. For example, the root node in the northwest corner has 1 unit delay. The two neighboring nodes that receive a clock signal from the root node have 2 unit delays. The nodes on diagonals from southwest to northeast can have the same unit delays. Using the clock distribution circuitry described herein, the unit delays can be fixed offsets. The nodes along these diagonals can receive clock signals having substantially the same timing delay. These diagonals can be referred to as phases or waves. The phases correspond to different clock signal arrival times in the nodes. The clock signal distribution corresponding to the map of FIG. 2 can implement a 35 phase mesochronous phase clock. The number of phases of a mesochronous cloak signal for a node array with clock distribution circuitry described herein can be the number of rows plus the number of columns minus one.

In certain embodiments, rather than the clock signal traversing the node array 102 with waves that are formed along a diagonal of the node array, the clock signals can propagate in waves that traverse the node array 102 in the row or column direction. For example, rather than outputting the clock signal to the south and the east, each node may output the clock signal to either the south or the east. In this way, the clock signal may propagate in waves that travel to the south or to the east. However, aspects of this disclosure are not limited to a particular direction of travel for the clock signals, and the clock signals can propagate along other diagonals and/or to the north or west.

The offsets of FIG. 2 can be accounted for when routing signals between nodes. A signal that is routed from an originating node that generates the signal to a node that is north or west can travel upstream and lose one unit delay in a node array corresponding to FIG. 2. A signal that is routed from an originating node to a node that is south or east can travel downstream and gain one unit delay in a node array corresponding to FIG. 2. Signals traveling upstream can be routed faster than signals traveling downstream to account for the unit delay and meet setup and hold time specifications.

In certain embodiments, each node of the node array 102 can be an instance of a computing circuit. In certain applications, most of the nodes include instances of a computing circuit and one or more of the remaining nodes include instances of a different circuit, such as a globals node. Globals nodes may refer to nodes that do not include circuitry for performing processing tasks. In some implementations, compute nodes and globals nodes may both include communication interfaces to enable communication with neighboring nodes. In some implementations, the communication interfaces for compute nodes may be the same as the communication interfaces for globals nodes.

Track Plans for Reducing Clock Skew

Aspects of this disclosure relate to a track plan (also referred to as the wiring plan) for communication of signals between nodes that is "clock-offset aware." The track plans described herein can improve upstream and downstream signal timing in order to reduce or eliminate skew resulting from the direction in which the signals are travelling with respect to the direction in which clock signals propagate.

Further aspects of this disclosure provide techniques for defining the metal track width of a heavily-replicated functional design with a mesh clock distribution. Certain electronic design automation tools allow the track definition by choosing the width, spacing, and/or location of metal tracks with guidance from a foundry design rule manual. Aspects of this disclosure further provide methods for defining the track plan for a functional design unit and assigning tracks to signals based on the direction of the communication traffic. For example, the signals that are traveling along with (e.g., in the same direction as) a clock signal can be routed with smaller width tracks, while the signals traveling against (e.g., in the opposite direction from) the clock signal can be routed with larger width tracks. Some or all of these signals can also be directionally interleaved (alternating direction of signal) with each other, to reduce or minimize signal integrity issues (e.g., crosstalk). For instance, all signals can be directionally interleaved in certain applications.

Typically, if the direction of the travel of signals is not accounted for, the tracks along which communication signal travel can have substantially the same width and spacing. This width and spacing can be sized for the longest and/or shortest anticipated delay time. Such width and spacing may be designed to meet setup time and hold time specifications. The use of tracks for interleaved signals as described herein can further allow for both a higher frequency design as well as reducing the area used by the tracks by minimizing the size of wires (also referred to as tracks) used to meet design targets. This can both reduce the cost of the design and also enable more replicated blocks to be fit into in the same physical area, thereby increasing performance per die.

Figure 3:
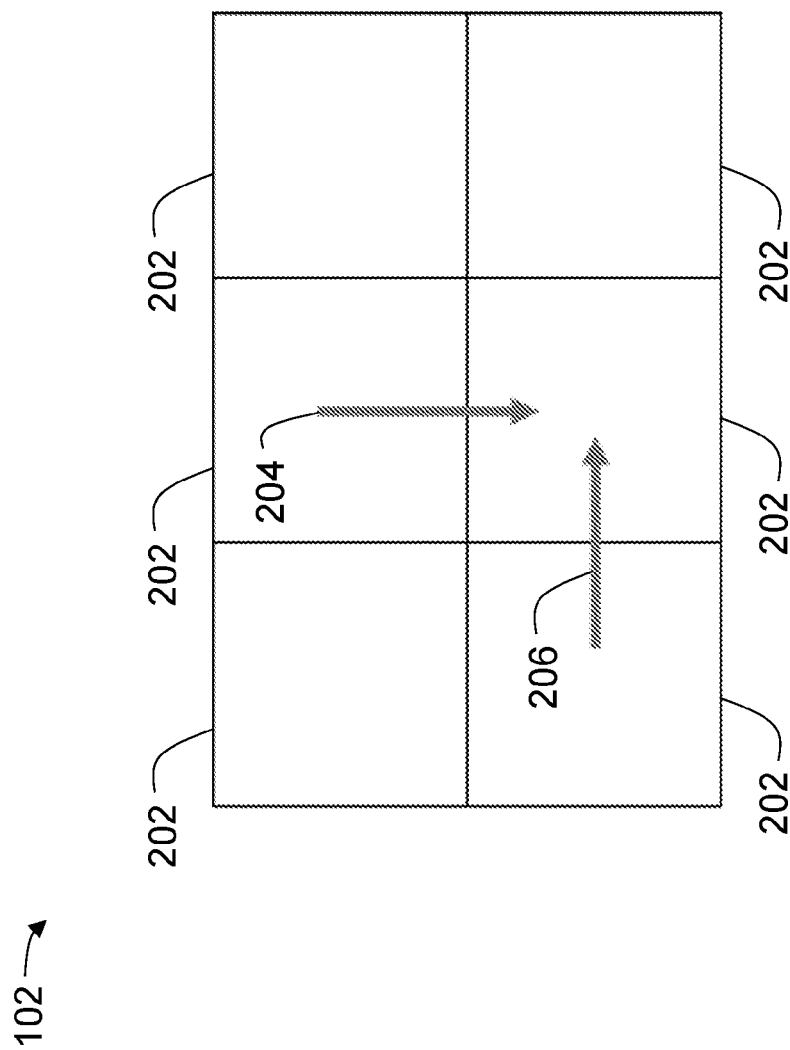
FIG. 3 illustrates a portion of a node array including example clock propagation directions in accordance with aspects of this disclosure.

FIG. 3 illustrates a portion of a node array 102 including example clock propagation directions in accordance with aspects of this disclosure. As shown in FIG. 3, the portion of the node array 102 includes a plurality of nodes 202. The nodes 202 are arranged in rows and columns. In some embodiments, clock signals can propagate though the node array 102 in both the vertical direction and the horizontal direction. As shown in FIG. 3, a clock signal can propagate in a first direction 204 between nodes 202 from top to bottom and the clock signal can propagate in a second direction 206 between nodes 202 from left to right. As illustrated in FIG. 3, the clock signal can propagate in two orthogonal directions in the node array 102. The clock signal can propagate through the node array 102 with delays as illustrated in FIG. 2.

Figure 4A:
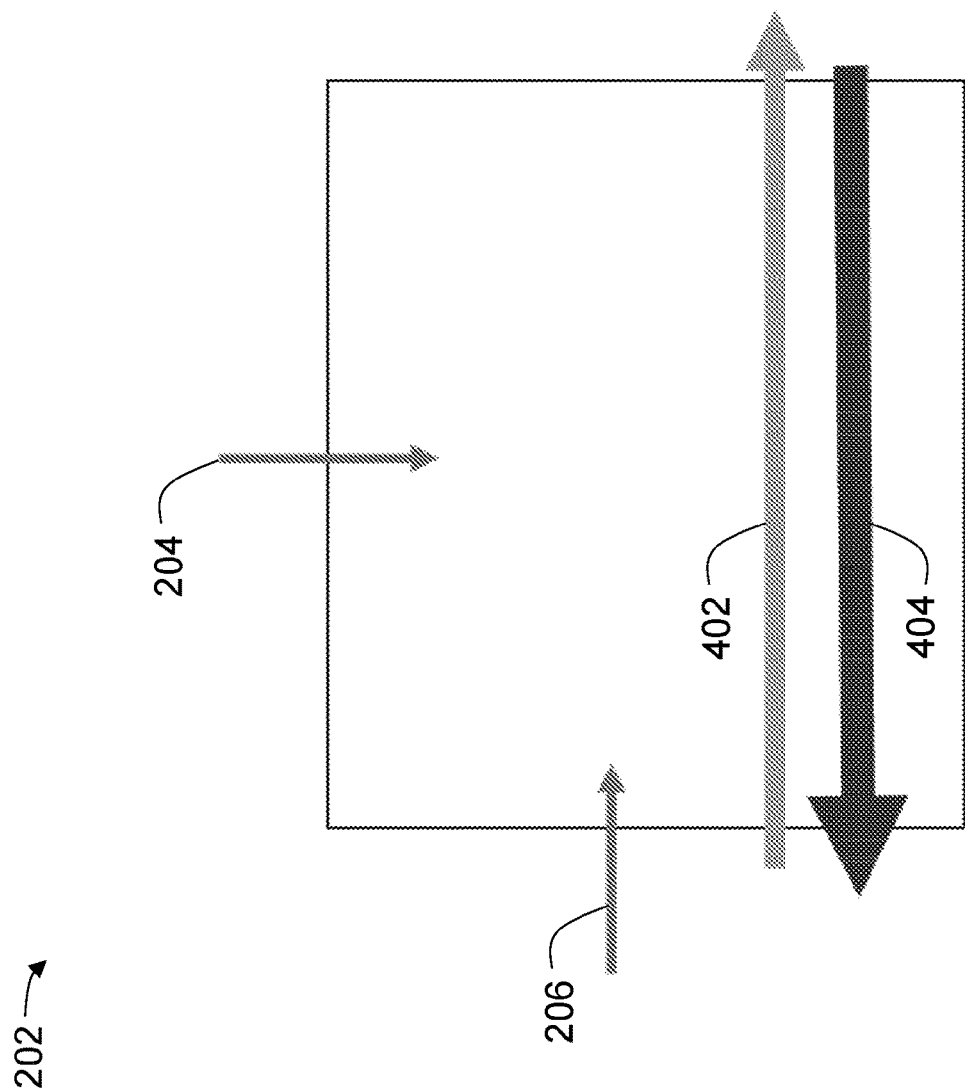

FIGS. 4A and 4B illustrate example clock propagation directions as well as signal propagation directions for a node 202 of the array 102 in accordance with aspects of this disclosure. In particular, FIG. 4A illustrates horizontal wires configured to allow communication signals to propagate in the horizontal direction, and FIG. 4B illustrates vertical wires configured to allow communication signals to propagate in the vertical direction.

With reference to FIG. 4A, the node 202 includes a first horizontal wire 402 configured to propagate communication signals between nodes from left to right in the second direction 206. The node 202 further includes a second horizontal wire 404 configured to propagate communication signals between nodes from right to left in the opposite direction from the second direction 206. The arrows at the ends of horizontal wires 402 and 404 in the drawings are for illustrative purposes only to show signal propagation directions.

With reference to FIG. 4B, the node 202 further includes a first vertical wire 406 configured to propagate communication signals between nodes from top to bottom in the first direction 204. The node 202 further includes a second vertical wire 408 configured to propagate communication signals between nodes from bottom to top in the opposite direction from the first direction 204. The arrows at the ends of vertical wires 406 and 408 in the drawings are for illustrative purposes only to show signal propagation directions.

In certain embodiments, the first horizontal wire 402 and the second horizontal wire 404 can be formed in a different layer from the first vertical wire 406 and the second vertical wire 408. The vertical wires 406 and 408 extend 404 can extend in the first direction 204 that is orthogonal to a second direction 206 in which the horizontal wires 402 extend.

Communication signals between nodes 202 are designed to arrive at the destination nodes 202 (e.g., abutting neighboring node to the node 202 from which they depart) to meet setup time and hold time specifications. As used herein, setup time generally refers to the minimum amount of time for the input to an electronic component to be stable before a clock edge to ensure that the component can correctly read its input. Hold time as used herein generally refers to the minimum amount of time for the input to an electronic component to be stable after a clock edge to ensure that the component can correctly read its input. Setup time and hold time can be defined for any electrical components which read input signals at a timing defined by a clock signal, including, for example, flip-flops, registers, memories, processors, multiplexers, decoders, etc.

Because communication signals propagating along the second direction 206 from left to right in FIG. 4A (e.g., via the first horizontal wire 402) are propagating in the second direction 206, these signals can have a longer propagation delay and still meet setup and hold times. The timing at which a communication signal will be stable at the input of a node 202 to satisfy the setup time and hold time of the node 202 is dependent upon the time at which a clock signal will arrive at the node 202. For example, since the communication signal travelling along the first horizontal wire 402 is propagating in the second direction 206, the communication signal propagation along the first horizontal wire 402 can arrive at a neighboring node at an earlier time relative to the clock signal propagating to the neighboring node along the second direction 206 than the communication signal propagating along the second horizontal wire 404 which is traveling in the opposite direction of the clock signal.

Communication signals propagating in the opposite direction as the clock signal (e.g., along the second horizontal wire 404 or the second vertical wire 408) can be designed to have a shorter propagation delay compared to communication signals propagating in the same direction as the clock signal (e.g., along the first horizontal wire 402 or the first vertical wire 406). Thus, communication signals propagating in the same direction as the clock signal can be considered to have a benefit of clock propagation time, while communication signals propagating in the opposite direction as the clock signal can be considered to have a penalty of clock propagation time.

To achieve a longer propagation delay for communication signals propagating in the same direction as the clock signal and shorter propagation delay for communication signals propagating in the opposite direction as the clock signal, aspects of this disclosure relate to techniques for tuning wire delays to meet setup time and hold time specifications in a node array 102 with a mesochronous clock.

The propagation delay along communication wires 402-408 may be related to the RC delay of the wires 402-408. In some embodiments, the length of the wires 402-408 may be determined by the spacing of the nodes 202 and the height of the wires 402-408 may be determined by the process used to form the wires (e.g., lithography) and the metal layer. Thus, the width of the wires 402-408 is one design parameter that can be used to adjust the propagation delay introduced by the wires 402-408. In some embodiments, the first horizontal wire 402 and the first vertical wire 406 used to communicate signals in the same direction as the clock propagation can be formed with a relatively smaller width to increase propagation delay, while the second horizontal wire 404 and the second vertical wire 408 used to communicate signals in the opposite direction from the clock propagation can be formed with a relatively greater width to decrease propagation delay. The specific widths of the wires 402-408 can be formed such that signals propagating on the wires 402-408 meet the setup time and hold time for electrical components in the destination nodes 202. In one embodiment, the widths of the wires 402-408 may be selected such that the communication signals propagating on the wires 402-408 arrive at substantially the midpoint between the setup time and the hold time, however, aspects of this disclosure are not limited thereto.

In certain embodiments, the nodes 202 may not have a square shape, and thus, the time for a signal to travel vertically across a given node 202 may not be the same as the time for a signal to travel horizontally across the node 202. For example, in certain embodiments, the nodes 202 may have a greater length in the horizontal direction than a length in the vertical direction. In these embodiments, the widths of the first horizontal wires 402 may be greater than the widths of the first vertical wires 406, while the widths of the second horizontal wires 404 may be greater than the widths of the second vertical wires 408. However, when the amount of delay introduced by the difference in the relative lengths of the horizontal and vertical lengths of the node is negligible, the wires travelling in the same direction with respect to the clock signals, whether horizontal or vertical, may be substantially the same.

Figure 5A:
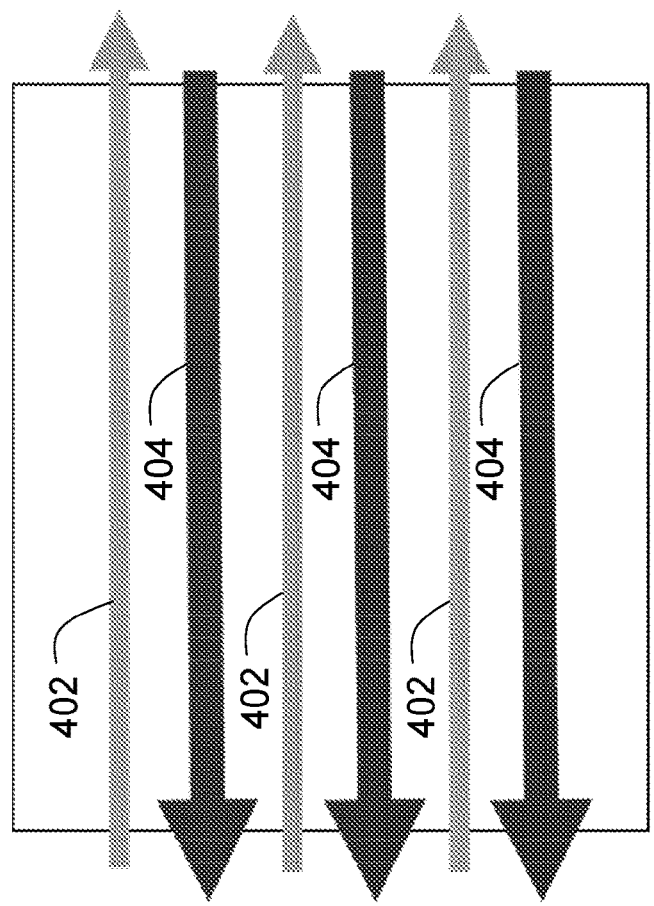
FIGS. 5A and 5B illustrate a plurality of example signal propagation directions for a node of the array in accordance with aspects of this disclosure.
Figure 5B:
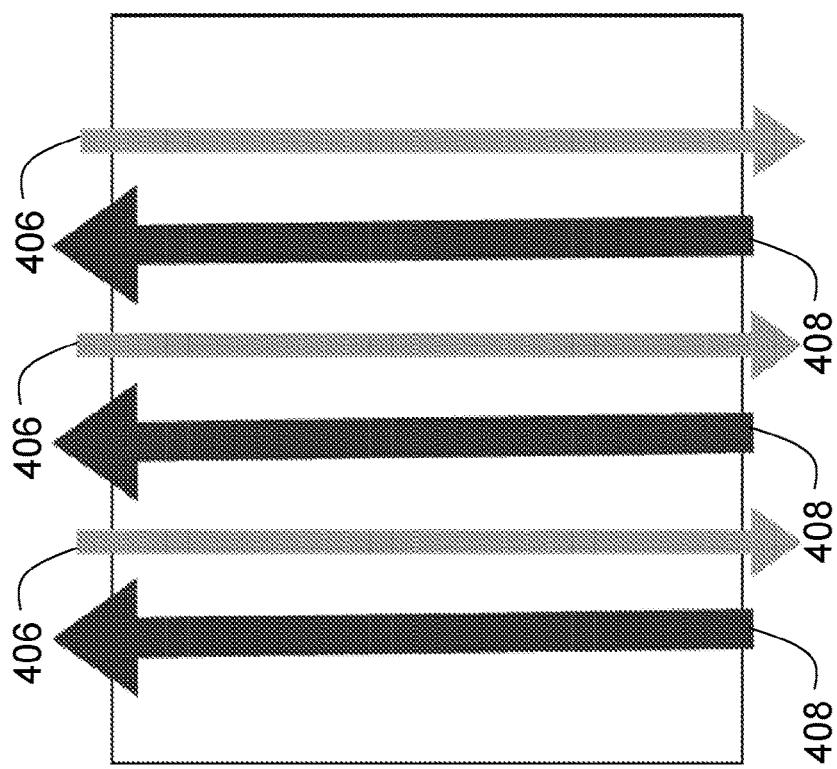

FIGS. 5A and 5B illustrate a plurality of example wires with signal propagation directions for a node 202 of the node array 102 in accordance with aspects of this disclosure. With reference to FIG. 5A, each node 202 can be connected to its horizontal neighboring nodes 202 by a plurality of horizontal communication wires 402 and 404. As shown in FIG. 5B, each node 202 can be connected to its vertical neighboring nodes 202 by a plurality of vertical communication wires 406 and 408.

The proximity of adjacent communication wires 402-408 can lead to cross-talk between the wires 402-408. For example, when two signals are propagating in the same direction, an induced current between the wires 402-408 can result in crosstalk along the length of the wires 402-408. One technique for reducing this source of cross-talk is to place the communication wires 402-408 further apart. However, increasing the spacing between communication wires 402-408 can reduce the amount of bandwidth available for communication between nodes 202. Thus, aspects of this disclosure relate to interleaving communication wires 402-408 based on the direction of the signals propagating thereon as shown in FIGS. 5A and 5B. For example, each of the first horizontal wires 402 is adjacent to one or more of the second horizontal wires 404 and vice versa, such that signals on any two adjacent wires 402 and 404 are propagating in opposite directions. Similarly, each of the first vertical wires 406 is adjacent to one or more of the second vertical wires 408 and vice versa, such that signals on any two adjacent wires 406 and 408 are propagating in opposite directions. By interleaving the horizontal wires 402 and 404 and/or the vertical wires 406 and 408 based on the direction of the signals propagating thereon, the crosstalk between adjacent wires 402 and 404 and/or 406 and 408 may be limited to a single location (e.g., the point at which the opposing signals meet when traveling between nodes 202) along propagation path in certain applications.

Depending on the implementation, thousands of wires 402-408 can be used across a block of the tack plan design. These communication wires 402-408 can connect adjacent nodes 202 in a node array 102 that are tiled and stepped. In certain embodiments, the communications wires 402-408 can connect the nodes 202 in lower-level metal.

In some implementations, the track plan for the communication wires 402-408 can be generated in an automated fashion by redefining a track plan for the design and assigning to those tracks (e.g., wires 402-408) based on the directionality of signals communicated thereon. Compared to other track plans, track plans designed in accordance with aspects of this disclosure can achieve a higher number of wires 402-408 per given node 202 length, which can translate to a higher bandwidth design. In addition, the track plan can also address the unique clock skew associated with mesochronous clocking for a node array by adjusting the delay introduced by the communication wires 402-408. Moreover, the use of properly sized wiring can also enable the use of a higher frequency design, which can provide lower latency and/or higher performance.

In addition, other attempts at addressing signal delay and/or crosstalk may involve designing the wire size and/or spacing for the worst case scenario. This will lead to wires that are wider than necessary to meet setup time and hold time specifications as well as a lower density of wires than can be achieved according to aspects of this disclosure. In comparison to such designs, aspects of this disclosure can provide higher bandwidth (e.g., by using a greater number of communication wires in the same area) as well as lower latency signals (e.g., by reducing crosstalk via directionally interleaving the wires).

In some embodiments, the clock distribution network can be configured to propagate the clock signals in a row or column direction, such that the clock signal does not traverse the node array 102 along the diagonals as shown in FIG. 2. In these embodiments, the track plan may include wires that have different widths when the wires extend in the same or opposite direction from the clock signals, as well as wires that have substantially the same widths when the wires extend in a direction that is perpendicular to the direction of propagation of the clock signals.

Conclusion

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A node array with a track plan for improved clock skew, the node array comprising:
    a first node comprising computing circuitry and a plurality of wires configured to carry communication signals generated by the first node to neighboring nodes of the node array;
    a second node that is one of the neighboring nodes; and
    a third node that is one of the neighboring nodes, wherein a clock signal propagates from the second node to the first node to the third node in a first direction; and
    wherein the plurality of wires of the first node comprises:
    a first wire configured to carry a first communication signal to the second node in a direction that is opposite to the first direction, and
    a second wire configured to carry a second communication signal to the third node in the first direction,
    wherein the first wire has a width for carrying the first communication signal in an opposite direction as the clock signal that is greater than a width of the second wire for carrying the second communication signal in a same direction as the clock signal.

2. The node array of claim 1, wherein the width of the first wire and the width of the second wire contribute to meeting a setup time and a hold time for electronic components in the second and third nodes.

3. The node array of claim 1, wherein the plurality of wires further comprise:

a plurality of first wires extending in the first direction and comprising the first wire, the plurality of first wires configured to carry a plurality of first communication signals to the second node in the direction that is opposite to the first direction, and a plurality of second wires extending in the first direction and comprising the second wire, the plurality of second wires configured to carry a plurality of second communication signals to the third node in the first direction, wherein the plurality of first wires are interleaved with the plurality of second wires.

4. The node array of claim 1, wherein the node array further comprises:

a fourth node that is one of the neighboring nodes; and
a fifth node that is one of the neighboring nodes, wherein the clock signal propagates from the fourth node to the first node to the fifth node in a second direction that is perpendicular to the first direction, wherein the plurality of wires of the first node further comprises:

a third wire extending in the second direction and configured to carry a third communication signal to the fourth node in a direction that is opposite to the second direction; and a fourth wire extending in the second direction and configured to carry a fourth communication signal to the fifth node in the second direction, wherein the third wire has a width that is greater than a width of the fourth wire.

5. The node array of claim 4, wherein:

each of the first, second, third, fourth, and fifth nodes has a greater length in the first direction than a length in the second direction, the width of the first wire greater than the width of the third wire, and the width of the second wire is greater than the width of the fourth wire.

6. The node array of claim 4, wherein the plurality of wires further comprise:

a plurality of third wires extending in the second direction and comprising the third wire, the plurality of third wires configured to carry a plurality of third communication signals to the fourth node in the direction opposite to the second direction, and a plurality of fourth wires extending in the second direction and comprising the fourth wire, the plurality of fourth wires configured to carry a plurality of fourth communication signals to the fifth node in the second direction, wherein the plurality of third wires are interleaved with the plurality of fourth wires.

7. The node array of claim 1, wherein the clock signal has a substantially fixed delay when propagating between neighboring nodes.

8. The node array of claim 1, wherein nodes of the node array are configured to operate with a timing offset compared to other nodes based on a timing at which the nodes receive the clock signal.

9. A node of a node array with track plan for improving clock skew in the node array, the node comprising:

computing circuitry configured to generate communication signals; and a plurality of wires configured to enable the communication signals to propagate to adjacent nodes of the node array, wherein the nodes of the node array are configured to receive a distributed clock signal that propagates in at least a first direction between the adjacent nodes, wherein the plurality of wires comprise:

a first wire configured to carry a first communication signal in a direction opposite to the first direction, and a second wire configured to carry a second communication signal in the first direction, wherein the first wire has a width for carrying the first communication signal in an opposite direction as the distributed clock signal that is greater than a width of the second wire for carrying the second communication signal in a same direction as the distributed clock signal.

10. The node of claim 9, wherein the width of the first wire and the width of the second wire contribute to meeting a setup time and a hold time for electronic components in respective destination nodes for the first communication signal and the second communication signal.

11. The node of claim 9, wherein the plurality of wires further comprise:

a plurality of first wires extending in the first direction and comprising the first wire, the plurality of first wires configured to carry a plurality of first communication signals in the direction opposite to the first direction, and a plurality of second wires extending in the first direction and comprising the second wire, the plurality of second wires configured to carry a plurality of second communication signals in the first direction, wherein the plurality of first wires are interleaved with the plurality of second wires.

12. The node of claim 9, wherein:

the distributed clock signal further propagates in a second direction between the adjacent nodes, the second direction being perpendicular to the first direction, and the plurality of wires further comprise:

a third wire extending in the second direction and configured to carry a third communication signal in a direction opposite to the second direction; and a fourth wire extending in the second direction and configured to carry a fourth communication signal in the second direction, wherein the third wire has a width that is greater than a width of the fourth wire.

13. The node of claim 12, wherein:

the node has a greater length in the first direction than a length in the second direction, the width of the first wire greater than the width of the third wire, and the width of the second wire is greater than the width of the fourth wire.

14. The node of claim 12, wherein the plurality of wires further comprise:

a plurality of third wires extending in the second direction and comprising the third wire, the plurality of third wires configured to carry a plurality of third communication signals in the direction opposite to the second direction, and a plurality of fourth wires extending in the second direction and comprising the fourth wire, the plurality of fourth wires configured to carry a plurality of fourth communication signals in the second direction, wherein the plurality of third wires are interleaved with the plurality of fourth wires.

15. The node of claim 9, wherein the distributed clock signal is further configured to be distributed with a substantially fixed delay when propagating between adjacent nodes.

16. The node of claim 9, wherein the node is configured to operate with a timing offset compared to other nodes of the node array based on a timing at which the node receives the distributed clock signal.

17. A method of manufacturing a node array, the method comprising:
   forming a first node comprising computing circuitry and a plurality of wires configured to carry communication signals generated by the first node to neighboring nodes of the node array;
   forming a second node that is one of the neighboring nodes; and
   forming a third node that is one of the neighboring nodes, wherein a clock signal propagates from the second node to the first node to the third node in a first direction, and
   wherein the plurality of wires of the first node comprises:
   a first wire configured to carry a first communication signal to the second node in a direction that is opposite to the first direction, and
   a second wire configured to carry a second communication signal in the first direction,
   wherein the first wire has a width for carrying the first communication signal in an opposite direction as the clock signal that is greater than a width of the second wire for carrying the second communication signal in a same direction as the clock signal.

18. The method of claim 17, wherein:
   the width of the first wire and the width of the second wire are selected to meet a setup time and a hold time for electronic components in the second and third nodes.

19. The method of claim 17, wherein the plurality of wires further comprise:
   a plurality of first wires extending in the first direction and comprising the first wire, the plurality of first wires configured to carry a plurality of first communication signals to the second node in the direction that is opposite to the first direction, and
   a plurality of second wires extending in the first direction and comprising the second wire, the plurality of second wires configured to carry a plurality of second communication signals to the third node in the first direction,
   wherein the plurality of first wires are interleaved with the plurality of second wires.

20. The method of claim 17, wherein the node array further comprises:
   a fourth node that is one of the neighboring nodes; and
   a fifth node that is one of the neighboring nodes, wherein the clock signal propagates from the fourth node to the first node to the fifth node in a second direction perpendicular to the first direction,
   the plurality of wires of the first node further comprise:
   a third wire extending in the second direction and configured to carry a third communication signal to the fourth node in a direction that is opposite to the second direction; and
   a fourth wire extending in the second direction and configured to carry a fourth communication signal to the fifth node in the second direction,
   wherein the third wire has a width that is greater than a width of the fourth wire.

* * * * *